Dec. 29, 1959 R. H. DAWSON 2,918,936
LIQUID METERING DEVICE AND CONTROL VALVE THEREFOR
Filed Oct. 9, 1956 3 Sheets-Sheet 1

Inventor
Robert H. Dawson
By Hill, Sherman, Merroni, Gross & Simpson Attys

Dec. 29, 1959   R. H. DAWSON   2,918,936
LIQUID METERING DEVICE AND CONTROL VALVE THEREFOR
Filed Oct. 9, 1956   3 Sheets-Sheet 2

Inventor
Robert H. Dawson
By Hill, Sherman, Meroni, Gross & Simpson Attys

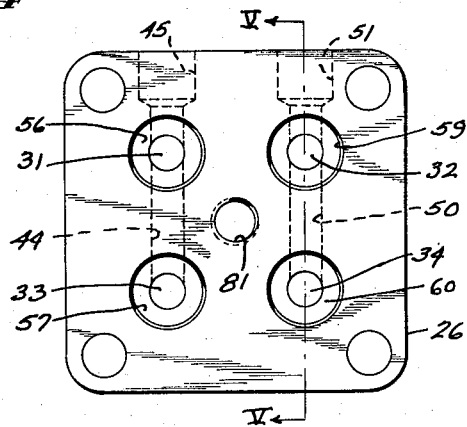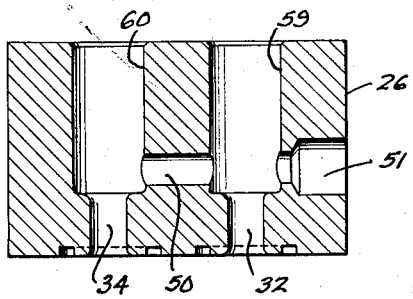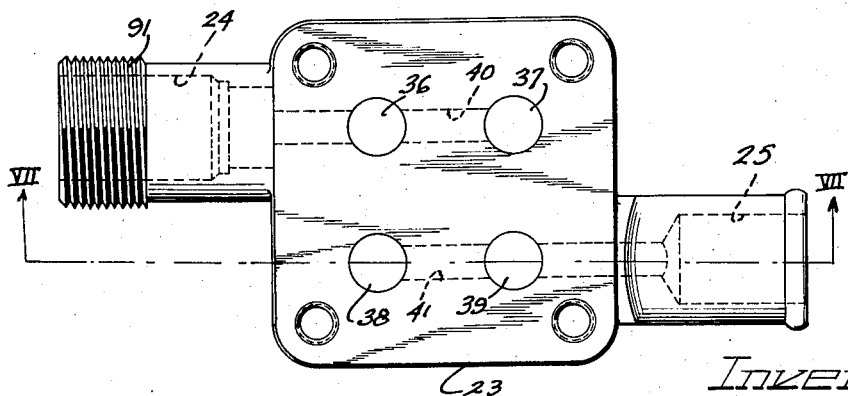

United States Patent Office 2,918,936
Patented Dec. 29, 1959

2,918,936

LIQUID METERING DEVICE AND CONTROL VALVE THEREFOR

Robert H. Dawson, Chicago, Ill., assignor to The Dole Valve Company, Chicago, Ill., a corporation of Illinois Application October 9, 1956, Serial No. 614,966

2 Claims. (Cl. 137—599.1)

This invention relates to improvements in devices for metering measured volume of liquids and more particularly relates to such devices and control valves therefor as are adapted to fill ice cube trays for automatic ice makers.

A principal object of the invention is to provide a novel and improved form of liquid metering device in which metering is effected by filling a chamber with liquid and displacing an equivalent amount of liquid from the chamber during a next successive filling operation.

A further object of the invention is to provide a liquid metering device in which a reservoir has inlets at each end thereof and in which the admission of liquid to one inlet will displace an equal volume of liquid from the other inlet and vice versa to effect a metering operation during each operation of filling the reservoir.

A further object of the invention is to provide a liquid metering device having a reservoir, one half of which has a diaphragm therein conforming to the wall thereof, in which filling of the reservoir displaces the diaphragm to conform to the opposite half of the reservoir and displaces a volume of liquid therefrom equivalent to the volume of liquid entering the reservoir.

A still further object of the invention is to provide a liquid metering device including a reservoir having an inlet in each end thereof and a single diaphragm conforming to one half of the reservoir when in one position and to the opposite half of the reservoir when in an opposite position, together with a novel and improved valving arrangement for admitting liquid into one end of the reservoir and releasing liquid from the opposite end of the reservoir by the operation of the single operating device for the valving.

A still further object of the invention is to provide a simple and novel form of four-way valve operated by a single operating device and so arranged so as to supply liquid through one outlet in one position of the valve and admit liquid through another outlet in another position of the valve, for discharge through a common metering outlet of the valve upon the operation of the single control device therefor.

These and other objects of the invention will appear from time to time as the following specification proceeds and with reference to the accompanying drawings wherein:

Figure 4 is a top plan view of the valve block;

Figure 5 is a sectional view taken substantially along line V—V of Figure 4;

Figure 6 is a plan view of the passageway body for the valve; and

Figure 7 is a sectional view taken substantially along line VII—VII of Figure 6.

Figure 1:
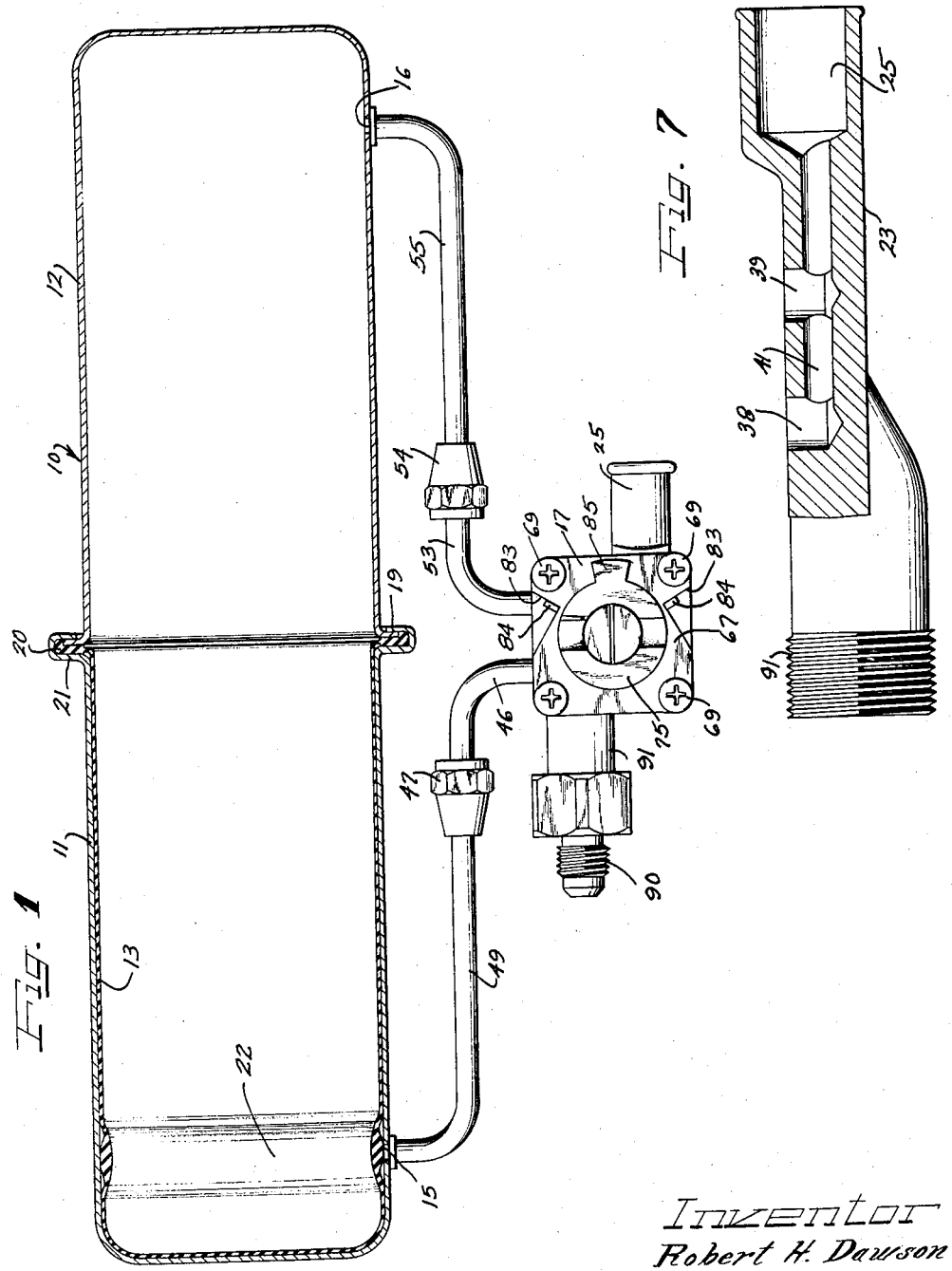
Figure 1 is a plan view of a metering device constructed in accordance with the present invention with the reservoir shown in longitudinal section.
Figure 2:
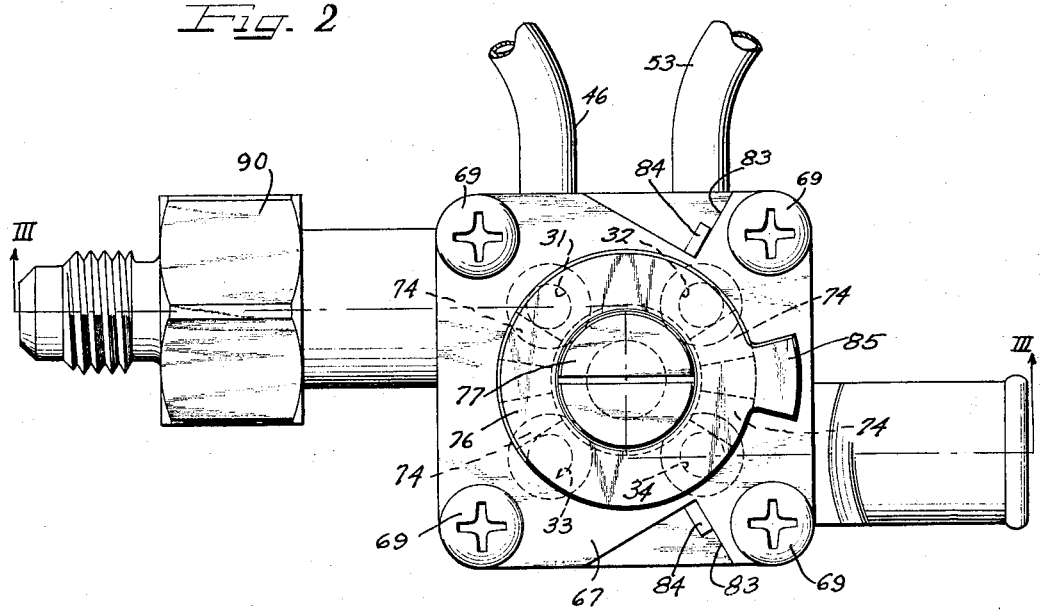
Figure 2 is a plan view of the valve for admitting liquid to one end of the reservoir and releasing liquid from the opposite end thereof and supplying a measured volume of liquid.

In the embodiment of the invention illustrated in the drawings I have shown in Figure 1 a reservoir 10, which may be generally cylindrical in form with closed opposite ends. The reservoir 10 is in two halves, 11 and 12, and has a diaphragm 13 extending along the walls of one half thereof and movable to extend along the walls of the opposite half thereof upon the admission of fluid under pressure through an inlet or port 15 into said reservoir, adjacent one end thereof. Assuming the reservoir is filled with liquid, the admission of fluid under pressure through the port 15 will displace the diaphragm 13 to extend along the wall of the second half of the chamber and displace liquid from the chamber through an inlet or port 16 leading into the second half of the chamber, equal in volume to the liquid admitted to the reservoir.

It may here be seen that the filling and measuring of liquid from the reservoir 10 is an alternate operation, that is, the reservoir is filled from one end and at the same time a measured volume of liquid is displaced from the opposite end of the reservoir. The reservoir is then filled from its opposite end and a measured volume of liquid is at the same time displaced from the opposite end thereof all under the control of a 4-way valve 17.

The half 12 of the reservoir 10 is shown as having a flange 19 abutting a thickened rib or flanged portion 20 of the diaphragm 13. The flanged portion 20 of the diaphragm 13, in turn abuts a flanged portion 21 of the half 11 of the reservoir and is maintained in sealing engagement with the flange 19 and flanged portion 21 by the crimping or spinning of the flanged portion 21 over the outer edge of the thickened rib 20 into engagement with the flange 19, to provide a sealed unitary watertight reservoir. The diaphragm 13 is shown as having a thickened portion 22 extending thereabout over the port 15 in one position of the diaphragm and over the port 16 in a second position of the diaphragm, to stiffen the diaphragm and accommodate fluid admitted through the required port, such as the port 15 shown in Figure 1, to reverse the end wall of the diaphragm and then turn the diaphrragm outside in upon the continued admission of fluid under pressure through the port 15, as an equivalent volume of liquid is displaced through the port 16.

Figure 3:
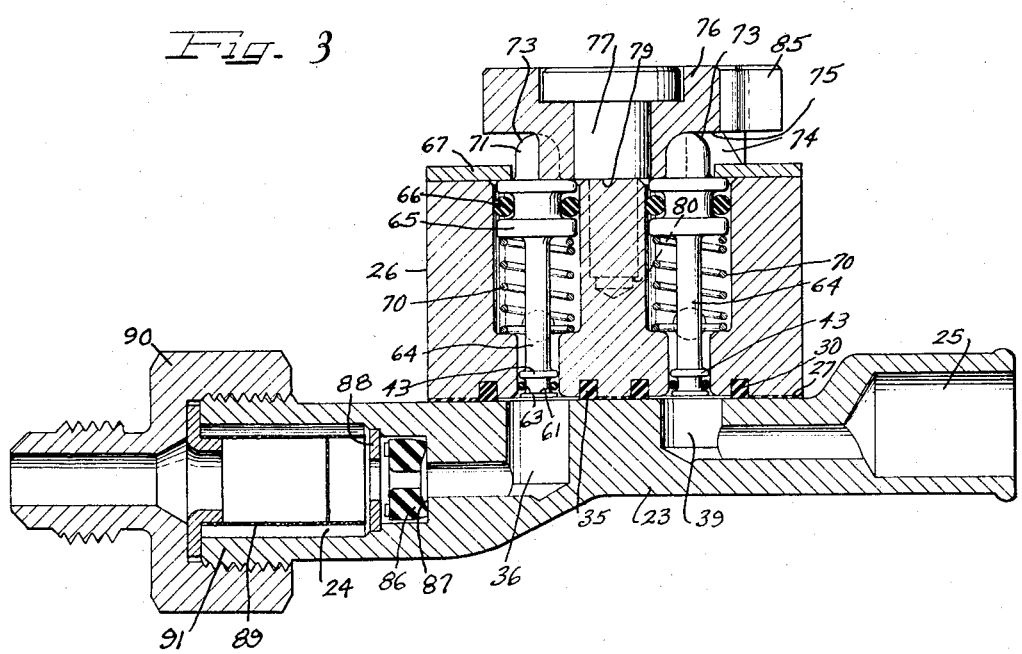
Figure 3 is a sectional view taken substantially along line III—III of Figure 2.

The valve 17 is shown in Figure 3 as comprising a body 23 having an inlet 24 leading thereinto and a metering outlet 25 leading therefrom in the same axial direction as the inlet 24, but spaced laterally therefrom, as shown in Figure 6. The valve also includes a valve block 26 mounted on the top face of the body 23 and sealed thereto, as by a gasket 27 and an annular sealing ring 30 extending on the outside of port openings 31, 32, 33 and 34 opening through the bottom of said valve block and sealed from each other by an annular seal and gasket 35 within the inner limits of said port openings.

The port openings 31, 32, 33 and 34 have communication with axially aligned passageways 36, 37, 38 and 39 respectively formed in the body 23 and leading inwardly of said body from the top thereof. The passageways 36 and 37 have communication with the inlet 24 through a passageway 40. The passageways 38 and 39 have communication with the outlet 25 through a passageway 41 aligned with said outlet and extending in parallel relation with respect to the passageway 40.

The ports 31, 32, 33 and 34 each have a valve 43 movable therealong into an associated passageway 36, 37, 38 or 9 to admit liquid into the associated port opening or to release liquid therefrom. The valves in each port opening are of the same structure, so the valves will all be designated by the same part numbers and one only need be herein described in detail.

The ports 31 and 33 are connected together by a passageway 44 on an opposite side of the valves 43 from the associated passageways 36 and 38. The passageway 44 has communication with a pressure outlet 45 from the valve body having a fitting 46 connected thereto, and connected with the port 15 in the reservoir 10 by a coupling 47 and a tube 49 leading from said coupling to the inlet 15.

The port openings 32 and 34 are connected together by a passageway 50 extending at right angles to the passageway 41 and at the opposite sides of the valve 43 from the associated passageways 37 and 39 in the body 23. The passageway 50 communicates with a pressure outlet 51 from the valve block 26 having a fitting 53 leading therefrom and connected with the inlet 16 through a coupling 54 and tube 55, brazed or otherwise secured in the inlet 16 and connected to the coupling 54. The passageway 44 is connected between enlarged diameter chambers 56 and 57 forming continuations of the respective ports 31 and 33 and opening to the top of the valve block 26. The passageway 50 in a like manner has communication with enlarged diameter chambers 59 and 60 forming enlarged diameter continuations of the ports 32 and 34 respectively and opening to the top of the valve block 26.

Each valve 43 is in the form of a spool 61 having an O-ring 63 between the lands of the spool and having a stem 64 extending upwardly from the spool along an associtaed chamber. The stem 64 terminates into an enlarged diameter spool 65 movable within an associated chamber and having an O-ring 66 between the lands thereof and sealing the chamber. The upper lands of the spool 65 are abutted by a retainer plate 67 suitably secured to the valve body as by machine screws 69, extending through the block 66 and having threaded engagement with the body 23. A compression spring 70 encircles each stem 64. Each spring 70 is seated in the bottom of the associated chamber at one end and on the inner end of a spool 65 at the opposite end thereof and biases the valve in a closed position. Each spool 65 has a projection 71 extending upwardly therefrom outside of the valve body and having a semi-spherical outer face 73 engaged by an inclined cam surface 74 extending downwardly from an under-surface 75 of an operating knob 76 upon turning movement of said knob in a direction to operate an associated valve. The knob 76 is provided with four camming surfaces 74 disposed between the outer faces 73, each one of which camming surfaces is engageable with a semi-spherical face 73 of an associated valve 43, upon movement of the knob in the proper direction to depress one valve 43 and accommodate the other valve 43 to be moved to a closed position by its biasing spring 70.

The knob 76 is rotatably mounted on the top of valve block 30 by a screw 77 extending through said knob and accommodating rotatable movement of said knob with respect thereto. The screw 77 has a shoulder 79 engaging the top face of the valve block 26, and has a threaded portion 80 depending therefrom and threaded within a threaded hole 81 leading within the valve block 26 from the top face thereof and located in the center of the top face of said block centrally of the ports 31, 32, 33 and 34.

The reteainer plate 67 is recessed at opposite sides thereof as indicated by reference characters 83. Angular faces of the recesses 83 engage stops 84 extending upwardly from the valve block. The stops 84 are adapted to be engaged by an indexing projection 85 projecting from the knob 76 to limit movement of said knob beyond positions to supply fluid under pressure through either of the outlets 45 or 51.

A means is provided to effect the supply of a uniform volume of liquid to the passageway 36 and tank 10 regardless of variations in pressure at the source, which is herein shown as comprising a resilient flow control annulus 86 seated against the shoulder 87 in the inlet passageway 84, and retained to said shoulder as by a retainer ring 88, spaced from said flow control annulus in an upstream direction with respect thereto. Thus, upon increases in pressure on the upstream face of the annulus 86, said annulus will flex along the shoulder 87 and toward said shoulder with a resultant restriction in the cross-sectional area of the orifice through the center of said annulus, to effect a uniform rate of flow of fluid through the valve regardless of pressure variations at the source, as is well known to those skilled in the art, so not herein shown or described further. A screen 89 is shown as extending within the inlet 24 to prevent scale and the like from entering the valve block and reservoir 10. A coupling 90, threaded on a lug 91, through which the inlet passageway 24 leads, is provided to retain the screen 89 to said inlet passageway and also to form a connector for connecting the valve to a source of fluid under pressure.

Upon turning movement of the knob 76 in a clockwise direction to engage the indexing projection 85 with one stop 84, the valve 43 in the port 31 will be opened by the associated cam 74 while the valve 43 in the port 33 will be closed by the bias of its spring. The valve 43 associated with the port 34 will also be opened by its associated cam while the valve 43 associated with the port 32 will be closed by the bias of its spring. This will provide a pressure passageway from the inlet 24 through the outlet 45 to supply fluid under pressure to the reservoir 10 through the port 15. It will also provide a passageway into the valve block 26 from the reservoir through the outlet 51 and passageway 50 out through the port 34 to the passageway 39 through the outlet 25. Thus when the valve is in its extreme clockwise position just described, fluid under pressure entering the reservoir 11 through the port 15 will force the diaphragm to move toward the port 16 and expel liquid from the reservoir 10 to pass through the outlet 25 to fill an ice cube tray (not shown) or a like device to be filled with a measured volume of water.

Upon turning of the knob 76 in an opposite direction, to engage the ear 85 with the opposite stop 84, the valve 43 in the port 31 will be closed by the bias of its spring 70, while the valve 43 associated with the port 33 will be moved into an open position by the associated cam face 74. At the same time the valve 43 associated with the port 32 will be moved to an open position, while the valve 43 in the port 34 will be in a closed position. This will provide a passageway for fluid under pressure from the inlet 24 through the passageway 40 and passageway 37 through the port 32 and out through the inlet 51 into the reservoir 10 through the port 16 thereof, to supply fluid under pressure to said reservoir to force the diaphragm to move to the lefthand end of said reservoir into the position shown in Figure 1, and expel a measured volume of liquid therefrom. A passageway will also be provided from the port 15 in the valve body through the inlet 45 and passageway 44 to the port 33 and passageway 38 and out through the passageway 41 through the outlet 25, to again fill an ice cube tray or like device with a measured volume of liquid.

It will be understood that modifications and variations of the present invention may be effected without departing from the spirit and scope of the novel concepts thereof.

I claim as my invention:

1. In a four-way valve, a body having an inlet leading thereinto, an outlet leading therefrom spaced laterally from said inlet and extending parallel with respect thereto, two pressure passageways associated with said inlet and opening to an outer face of said valve body, two other pressure passageways associated with said outlet in alignment with said first mentioned passageways and opening to the same outer face of said valve body as said first mentioned passageway, a valve block mounted on said body and sealed thereto and having four ports in axial alignment with said passageways and having fluid communication therewith, a first pressure outlet passageway leading from said block and having communication with two of said ports, one having communication with an inlet passageway and the other having communication with a metering outlet passageway, a second pressure outlet passageway from said valve block having communication with two other of said ports, one having communication with said inlet and the other having communication with said outlet, valve means movable along each port, controlling the passage of fluid from said inlet through either of said pressure outlets and from either of said pressure outlets through said metering outlet and having stems having engaging end portions projecting outwardly of said valve body, and a single knob pivotally mounted on said valve block having oppositely facing diametrically spaced cam means each of which is disposed between two of said stems to effect opening of one valve associated with said inlet and one pressure outlet and the opening of another valve associated with the other of said pressure outlets and said metering outlet in one direction of operation of said cam means and knob and to effect opening of two other valves in another direction of rotation of said knob and cam means to reverse the flow of liquid through said valve from said inlet to said metering outlet.

2. In a four-way valve, a valve body having an inlet leading thereinto, a metering outlet leading therefrom in the same axial direction as said inlet, four passageways in said valve body extending generally perpendicular to said inlet and said outlet, two communicating with said inlet, two communicating with said outlet, two pressure outlets from said valve body extending generally perpendicular to said passageways and in alignment therewith, four ports in said valve body in axial alignment with said passageways, two communicating with one of said pressure outlets, one of said two ports communicating with said inlet and the other of said two ports communicating with said metering outlet, two other of said ports communicating with said other pressure outlet, one of said two other ports communicating with said inlet and the other of said two other ports communicating with said metering outlet, individual valves movable along said ports into said passageways, each of said valves having a stem having an end portion projecting out of said valve body, a single knob pivotally mounted on said valve body and having diametrically spaced oppositely facing cams thereon, engageable with said projecting portions of said stems to effect opening of two of said valves upon turning of said knob in one direction and opening of two other of said valves upon turning of said knob in an opposite direction, and uniform rate of flow control means in said inlet effecting a uniform flow rate of liquid to the selected outlet regardless of variations in pressure at the source.

References Cited in the file of this patent
UNITED STATES PATENTS

| 1,844,086 | Aufuldish | Feb. 9, 1932 |
| 2,120,412 | Kucki | June 14, 1938 |
| 2,576,747 | Bryant | Nov. 27, 1951 |

FOREIGN PATENTS

| 271,154 | Switzerland | Oct. 15, 1950 |